(12) United States Patent
Holland (10) Patent No.: US 11,185,167 B1
(45) Date of Patent: Nov. 30, 2021

(54) COLLAPSIBLE CHAIR CANOPY

(71) Applicant: CleverMade, LLC, Carlsbad, CA (US)

(72) Inventor: Allen Keith Holland, Oceanside, CA (US)

(73) Assignee: CleverMade, LLC, Carlsbad, CA (US)

( * ) Notice: Subject to any disclaimer, the term of this patent is extended or adjusted under 35 U.S.C. 154(b) by 0 days.

(21) Appl. No.: 17/336,160

(22) Filed: Jun. 1, 2021

Related U.S. Application Data (60) Provisional application No. 62/704,822, filed on May 29, 2020.

(51) Int. Cl.
| | | |
|---|---|---|
| E04H 15/58 | (2006.01) | |
| A47C 7/66 | (2006.01) | |
| A47C 4/28 | (2006.01) | |
| B62B 9/14 | (2006.01) | |

(52) U.S. Cl.
CPC ............... *A47C 7/66* (2013.01); *B62B 9/142* (2013.01)

(58) Field of Classification Search
CPC ........... A47C 7/66; A47C 4/286; A47C 7/664; E04H 15/36
See application file for complete search history.

(56) References Cited

U.S. PATENT DOCUMENTS

| | | | |
|---|---|---|---|
| 5,515,564 A | * | 5/1996 | Lyons ...................... A47C 1/14 5/639 |
| D371,262 S | * | 7/1996 | Forbes, Sr. ................. D6/716.8 |
| 5,546,971 A | | 8/1996 | Leonhardt |
| D383,337 S | | 9/1997 | Lerner |
| 5,823,217 A | | 10/1998 | Rice |
| 5,921,258 A | * | 7/1999 | Francois ................... A61G 5/10 135/88.03 |
| 5,927,311 A | | 7/1999 | Jager |
| 6,789,557 B1 | | 9/2004 | Wahl |
| D555,748 S | | 11/2007 | Gyr et al. |
| 7,316,239 B2 | | 1/2008 | Yang |
| 7,654,277 B1 | | 2/2010 | Brewer et al. |
| 7,766,022 B2 | | 8/2010 | Livacich et al. |
| 7,950,406 B2 | | 5/2011 | Raniere |
| 8,001,986 B2 | | 8/2011 | Shumate |
| 8,091,962 B2 | | 1/2012 | Quinn |
| 8,231,172 B2 | | 7/2012 | Quinn |
| 8,292,362 B2 | | 10/2012 | Reeb et al. |

(Continued)

FOREIGN PATENT DOCUMENTS

| | | |
|---|---|---|
| CN | 209938402 U | 1/2020 |
| CN | 212243517 U | 12/2020 |

(Continued)

*Primary Examiner* — Shin H Kim
(74) *Attorney, Agent, or Firm* — Ryan Dean; Umberg Zipser LLP (57) ABSTRACT

Various embodiments of collapsible canopies for chairs and other objects are described, which have a sheet of material coupled to a frame that when expanded creates the canopy. The frame preferably comprises first and second support pieces that can be coupled together at opposite ends. Each of the support pieces can comprises two or more struts that are hingedly coupled in series, such that the at least two struts can pivot or move about a hinge from (i) a collapsed configuration where one of the struts is stacked on top of the other strut to (ii) an expanded configuration where the at least two struts extend in opposite directions from the hinge.

16 Claims, 11 Drawing Sheets

(56) References Cited

U.S. PATENT DOCUMENTS

| | | |
|---|---|---|
| 8,419,125 B2 | 4/2013 | Quinn |
| 8,517,465 B2 | 8/2013 | Reeb et al. |
| 8,789,550 B2 | 7/2014 | Livacich et al. |
| D725,424 S | 3/2015 | Cohen |
| 9,215,935 B2 | 12/2015 | Surek et al. |
| 9,629,470 B2 | 4/2017 | Bussell et al. |
| 10,066,417 B1 | 9/2018 | Linyard et al. |
| 10,472,850 B2 * | 11/2019 | Grace .................... E04H 15/58 |
| 10,920,447 B2 | 2/2021 | Xian |
| 2002/0020439 A1 | 2/2002 | Tate |
| 2003/0000563 A1 | 1/2003 | Kuperman |
| 2011/0108078 A1 | 5/2011 | Román et al. |
| 2014/0290710 A1 * | 10/2014 | Choi .................... E04H 15/405 |
| | | 135/126 |
| 2014/0318587 A1 * | 10/2014 | Anderson, Jr. ......... E04H 15/36 |
| | | 135/155 |
| 2017/0049238 A1 * | 2/2017 | Gilbert .................... A47C 7/66 |
| 2018/0116407 A1 | 5/2018 | Michal et al. |
| 2019/0125084 A1 | 5/2019 | Poddar |
| 2020/0405063 A1 * | 12/2020 | Bulger .................. A47C 7/664 |
| 2021/0007497 A1 | 1/2021 | Rowe, Jr. |

FOREIGN PATENT DOCUMENTS

| | | |
|---|---|---|
| WO | 2013012857 A2 | 1/2013 |
| WO | 2021016656 A1 | 2/2021 |

* cited by examiner

COLLAPSIBLE CHAIR CANOPY

This application claims priority to U.S. provisional patent application having Ser. No. 62/704,822 filed on May 29, 2020. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is canopies for chairs and other uses.

BACKGROUND

The following description includes information that may be useful in understanding the present invention. It is not an admission that any of the information provided herein is prior art or relevant to the presently claimed invention, or that any publication specifically or implicitly referenced is prior art.

Various canopies are known in the art, which are collapsible in a first direction. Typically, such canopies have a cloth piece that stretches between two support pieces, which can move toward one another in a first direction to collapse and move away from each other to expand the canopy. Unfortunately, such canopies when removable from a stroller or other object generally require a large amount of space to store due to their inability to collapse in more than one plane.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for collapsible canopies that are configured to collapse along two or more planes.

SUMMARY OF THE INVENTION

The inventive subject matter provides apparatus, systems and methods for collapsible canopies comprising a sheet of material coupled to a frame that when expanded creates a canopy that can be removable attached to a chair or other object to thereby provide a cover or shade for a person sitting in the chair, for example.

The frame preferably comprises a first support piece and a second support piece that can be coupled together at opposite ends, such that first and second support pieces can pivot or rotate with respect to one another. In some embodiments, the first and second support pieces can be connected to each other by one or more hinged pieces, which in some embodiments can have a latch that restricts rotation of the first and second support pieces in a first direction when engaged.

It is contemplated that the first support piece comprises at least two struts that are coupled to one another by a hinge, such that the at least two struts are movable about the hinge from (i) a collapsed configuration where one of the struts is stacked on top of the other strut to (ii) an expanded configuration where the at least two struts extend in opposite directions from the hinge.

In a similar manner, it is also contemplated that the second support piece comprises at least two struts that are coupled to one another by a different hinge, such that the at least two struts are movable about the hinge from (i) a collapsed configuration where one of the struts is stacked on top of the other strut to (ii) an expanded configuration where the at least two struts extend in opposite directions from the hinge.

In this manner, a length of each of the support pieces can be reduced in half or more when the support pieces are in the collapsed configuration.

Preferably, the struts of the first support piece initially rotate outwardly (i.e., away from one another) to move the expanded configuration to the collapsed configuration. To accomplish this, it is contemplated that one of the at least two struts of the first support piece can pivot about the hinge more than 180 degrees in a first direction when moving from the collapsed configuration to the expanded configuration, or in a second direction when moving from the expanded configuration to the collapsed configuration. Of course, in other embodiments, it is possible that the first support piece pivots about the hinge less than 180 degrees, although that would likely prevent the struts forming the support pieces from laying parallel with respect to one another.

In some embodiments, a first attachment mechanism is disposed at the first end and a second attachment mechanism is disposed at the second end. The attachment mechanisms can be used to removably attach the canopy to a chair or other object.

The struts are preferably flexible such that they can elastically bend and return to a normal position. It is contemplated that the struts could be composed of spring steel, fiberglass, plastic, or other material(s) or combinations thereof. This flexibility advantageously permits the support pieces to adapt the canopy to objects having different sizes and dimensions that may not be possible with a rigid material.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

FIGS. 1-10 illustrate one embodiment of a collapsible canopy 100. The canopy 100 preferably has a frame 102 and a sheet of material 104 connected to at least a portion of the frame 102 to create the canopy when the frame 102 is in an expanded configuration shown in FIGS. 1-3.

Figure 1:
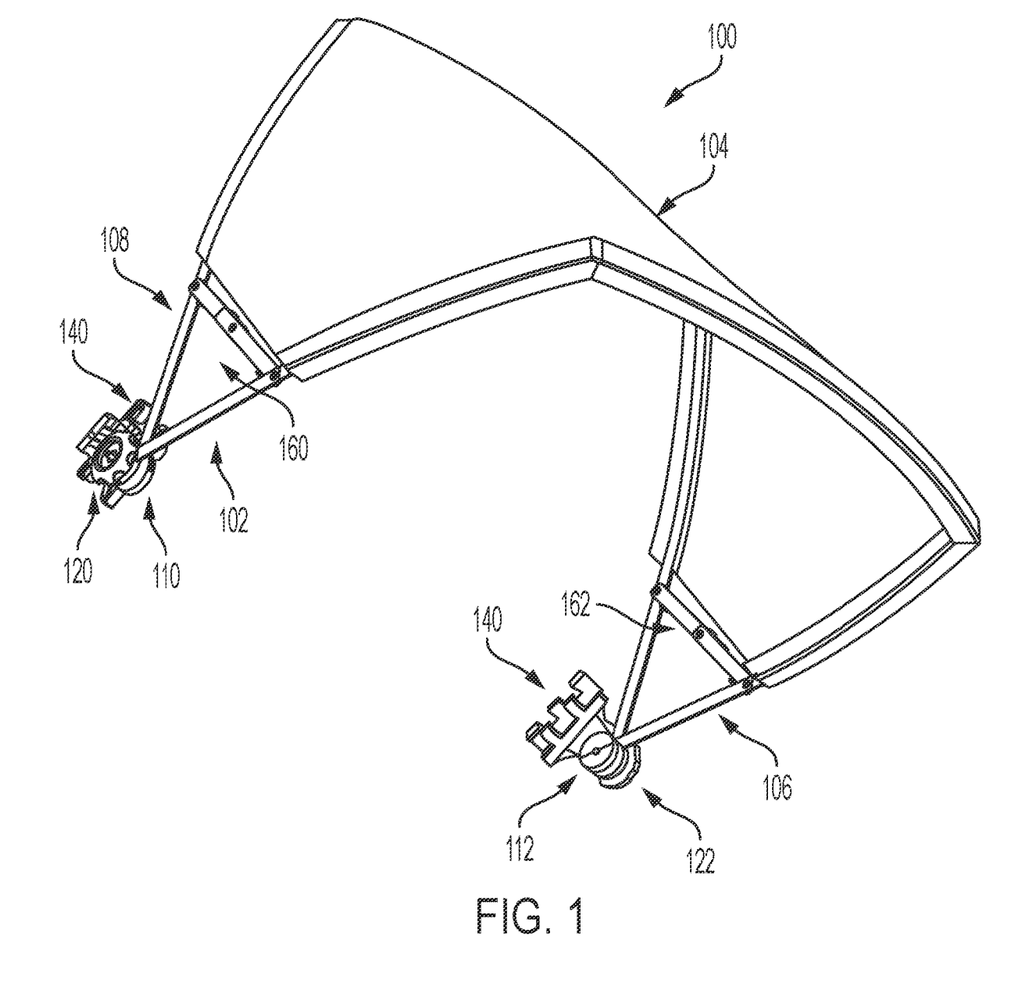
FIG. 1 illustrates a left, front perspective view of one embodiment of a collapsible canopy.
Figure 2:
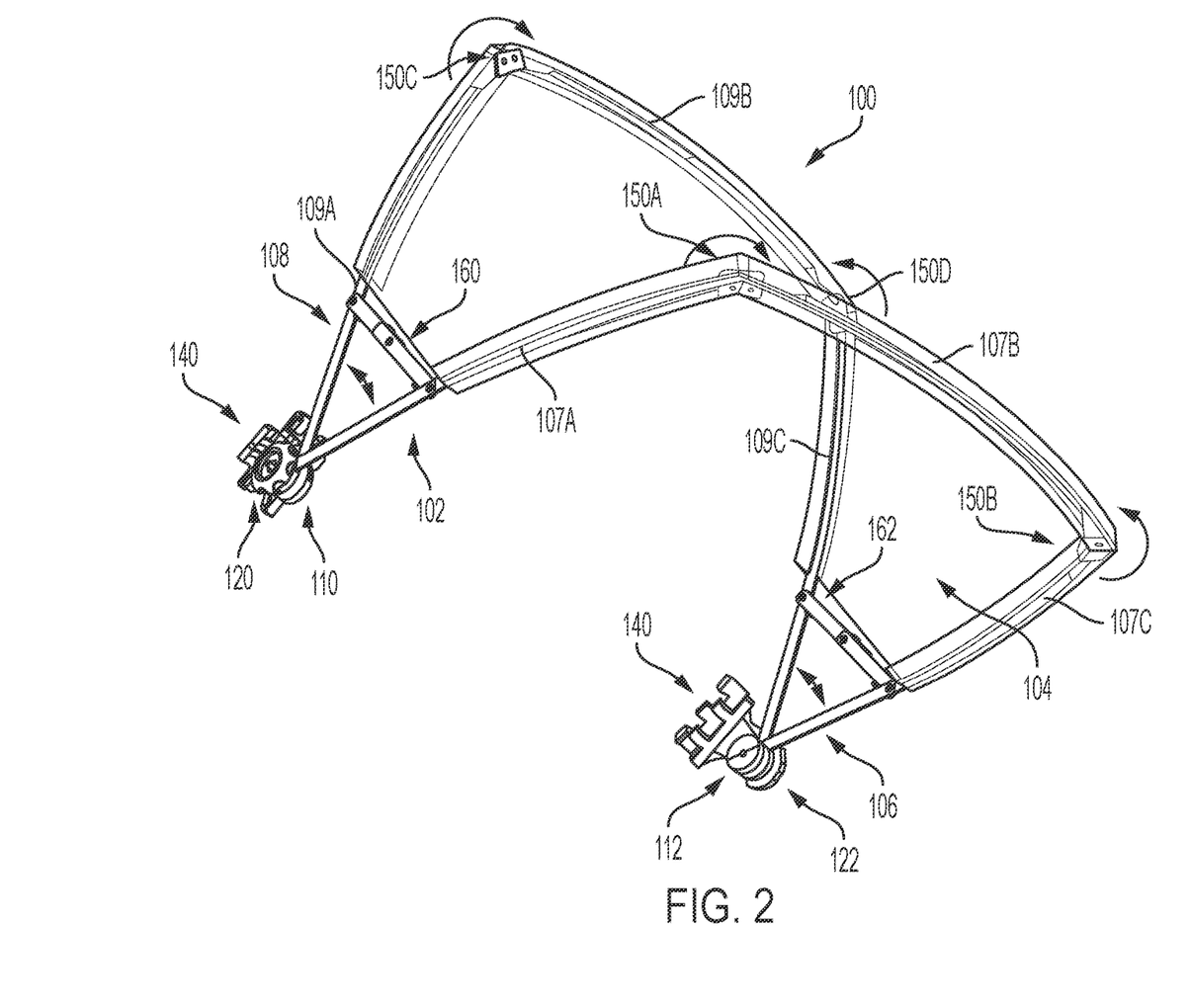
FIG. 2 illustrates another perspective view of the collapsible canopy of FIG. 1 with a clear sheet of material.
Figure 3:
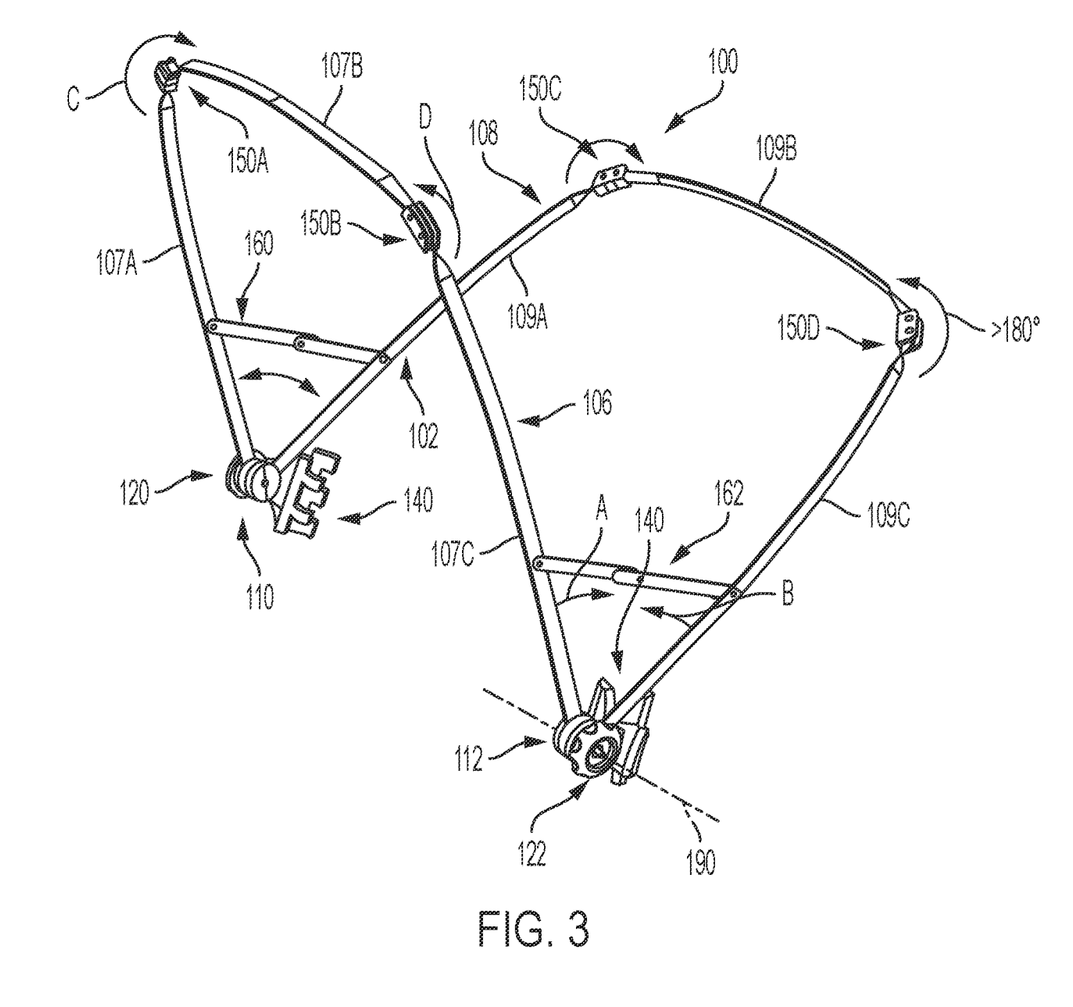
FIG. 3 illustrates a right, front perspective view of the collapsible canopy of FIG. 1.
Figure 4:
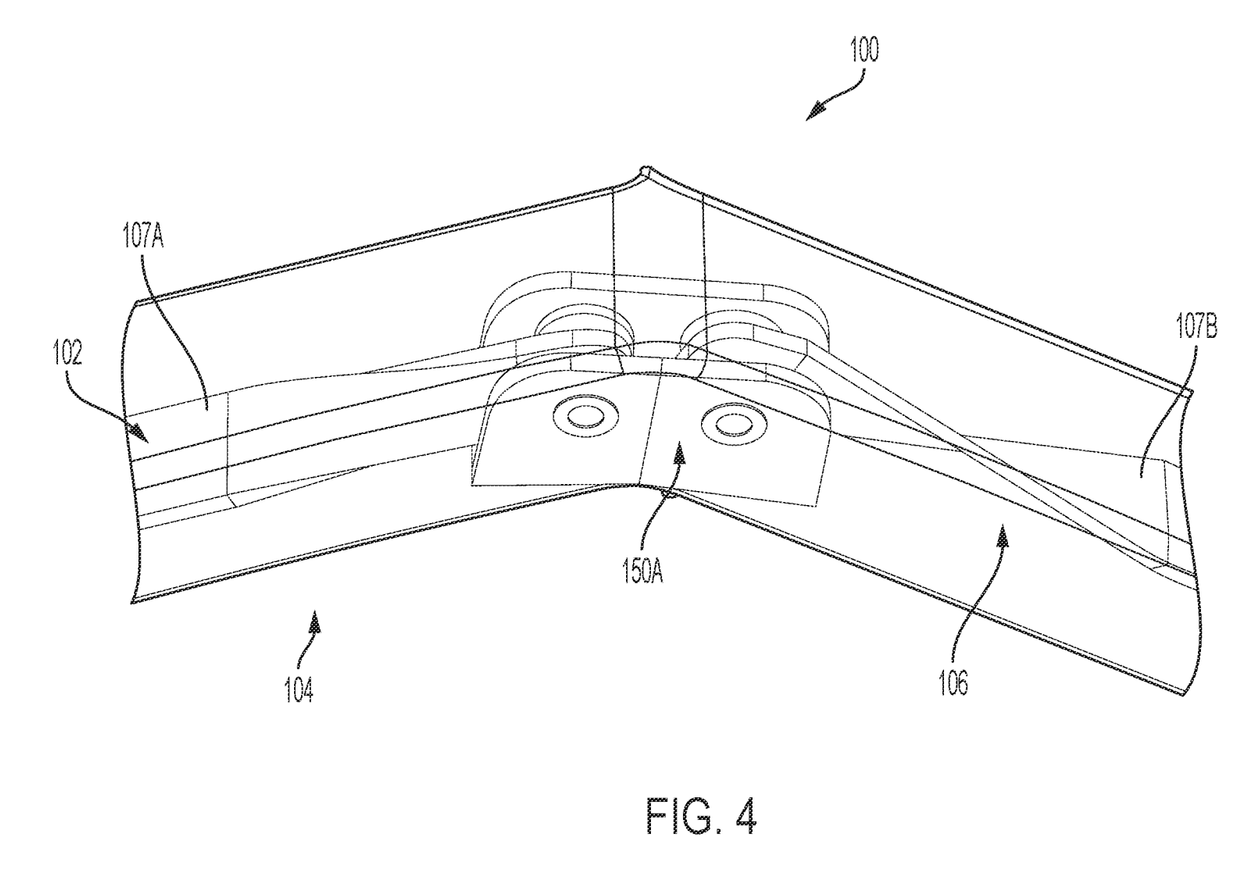
FIG. 4 illustrates an enlarged view of one of the hinges of the collapsible canopy of FIG. 1.

The frame 102 preferably comprises a first support piece 106 and a second support piece 108 that are coupled together at first and second opposing ends 110, 112. In this manner, the first support piece 106 and second support piece 108 each extends from the first end 110 to the second end 112. It is preferred that the sheet of material 104 extends from the first support piece 106 to the second support piece 108.

The first support piece 106 preferably comprises at least two struts, and as shown in FIGS. 1-3, may comprise a first strut 107A, a second strut 107B, and a third strut 107C, all of which are hingedly coupled in series with the second strut 107B being disposed between the first strut 107A and the third strut 107C. In the embodiment shown in FIGS. 1-3, the first strut 107A is hingedly coupled to the second strut 107B by a first hinge 150A, such that the first and second struts 107A, 107B are movable about the first hinge 150A. The second strut 107B is hingedly coupled to the third strut 107C by a second hinge 150B, such that the second and third struts 107B, 107C are movable about the second hinge 150B. In the expanded configuration shown in FIGS. 1-3, it is contemplated that the first, second and third struts 107A-107C form a "U" or "C" shape. Advantageously, the hinges 150A, 150B allow the first support piece 106 to fold and thereby reduce the space required to store the canopy 100 when the canopy 100 is in a collapsed configuration shown in FIG. 9.

In the embodiment shown in FIGS. 1-3, for example, the first and second hinges 150A, 150B permit movement of the first, second and third struts 107A-107C from (i) a collapsed configuration where each of the first strut 107A and the third strut 107C is stacked above the second strut 107B (shown in FIG. 9) to (ii) an expanded configuration where the first strut 107A and the third strut 107C are not stacked above the second strut 107B (shown in FIG. 3).

The second support piece 108 preferably also comprises at least two struts, and as shown in FIGS. 1-3, may comprise a fourth strut 109A, a fifth strut 109B, and a sixth strut 109C, all of which are hingedly coupled in series with the fifth strut 109B being disposed between the fourth strut 109A and the sixth strut 109C. In the embodiment shown in FIGS. 1-3, the fourth strut 109A is hingedly coupled to the fifth strut 109B by a third hinge 150C, such that the fourth and fifth struts 109A, 109B are movable about the third hinge 150C. The fifth strut 109B is hingedly coupled to the sixth strut 109C by a fourth hinge 150D, such that the fifth and sixth struts 109B, 109C are movable about the fourth hinge 150D. Advantageously, the hinges 150C, 150D allow the second support piece 108 to fold and thereby reduce the space required to store the canopy 100 when the canopy 100 is in a collapsed configuration shown in FIG. 9.

In the embodiment shown in FIGS. 1-3, for example, the third and fourth hinges 150C, 150D permit movement of the fourth, fifth and sixth struts 109A-109C from (i) a collapsed configuration where each of the fourth strut 109A and the sixth strut 109C is stacked above the fifth strut 109B (shown in FIG. 9) to (ii) an expanded configuration where the fourth strut 109A and the sixth strut 109C are not stacked above the fifth strut 109B (shown in FIG. 3).

By each of the support pieces 106, 108 comprising two hinges, this allows each of the support pieces 106, 108 to be folded into three pieces that can lie adjacent to one another.

Preferably, each of the struts are flexible and may be composed of spring steel, fiberglass, plastic, or other materials or combinations thereof, such that the struts can elastically bend or flex and return to a normal position. This flexibility advantageously permits the support pieces 106, 108 to adapt the canopy 100 to objects having different sizes and dimensions that may not be possible with a rigid material Each of the first and second ends 110, 112 preferably also comprises an attachment mechanism 140, which is configured to attach each of the first and second ends 110, 112 of the frame 102 to a chair or other object. Thus, for example, using the attachment mechanisms 140 disposed at each of the first and second ends 110, 112, the canopy 100 can be coupled to a chair or other object, such as to provide shade to whomever is sitting in the chair. When not in use, the canopy 100 can be removed from the object and collapsed for ease of storage.

In such embodiments, one of the attachment mechanisms 140 can be coupled to the first strut 107A and the fourth strut 109A and the other attachment mechanism 140 can be coupled to the third strut 107C and the sixth strut 109C.

Figure 5:
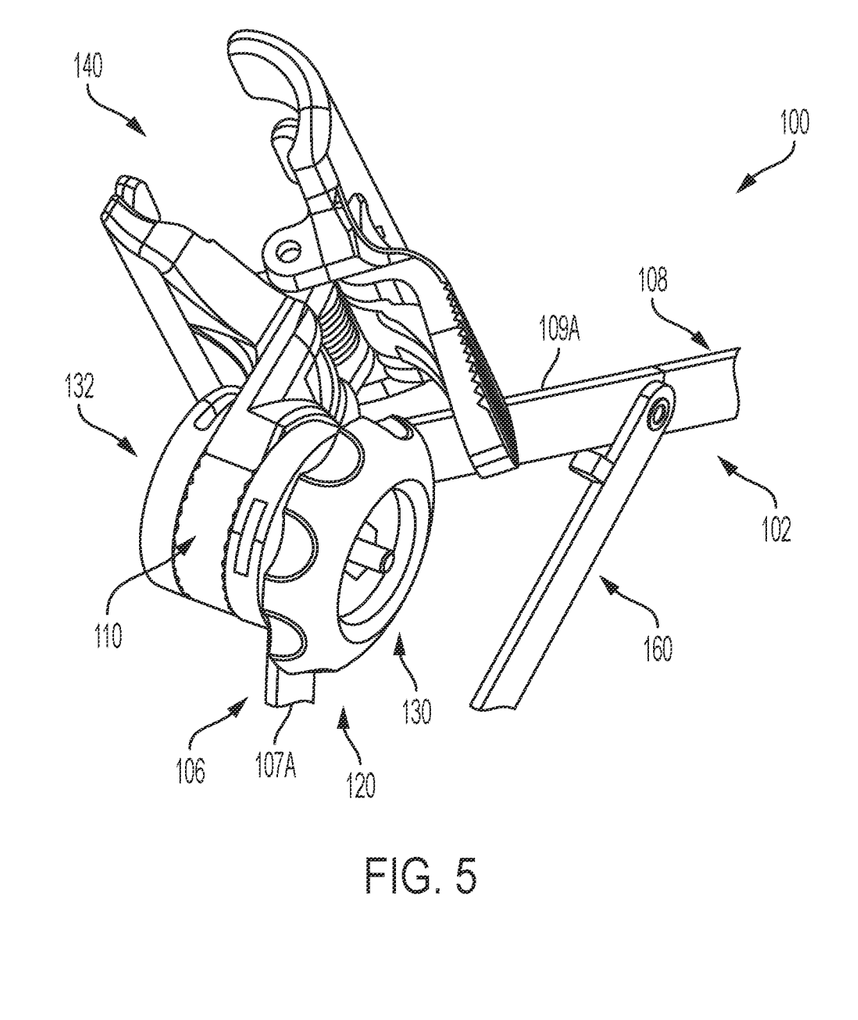
FIG. 5 illustrates an enlarged view of one of the attachment mechanisms of the collapsible canopy of FIG. 1.
Figure 6:
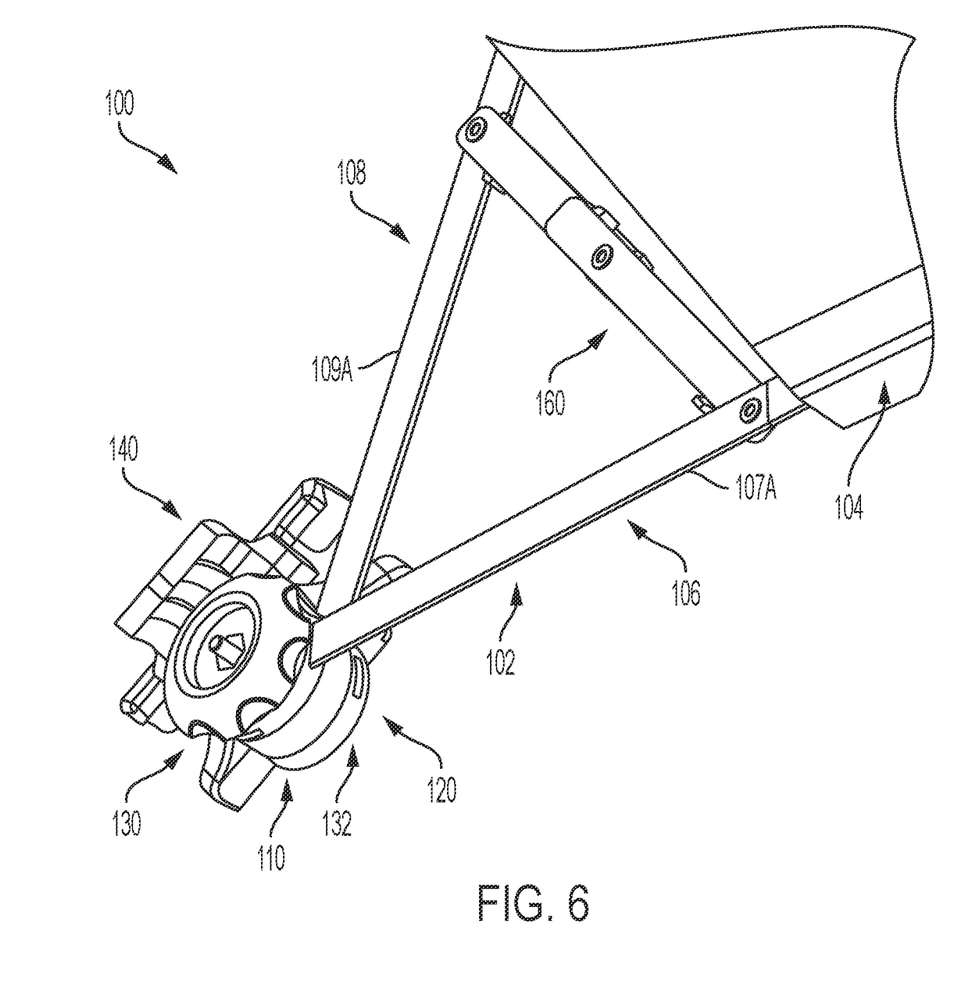
FIG. 6 illustrates an enlarged view of a left side of the collapsible canopy of FIG. 1.
Figure 10:
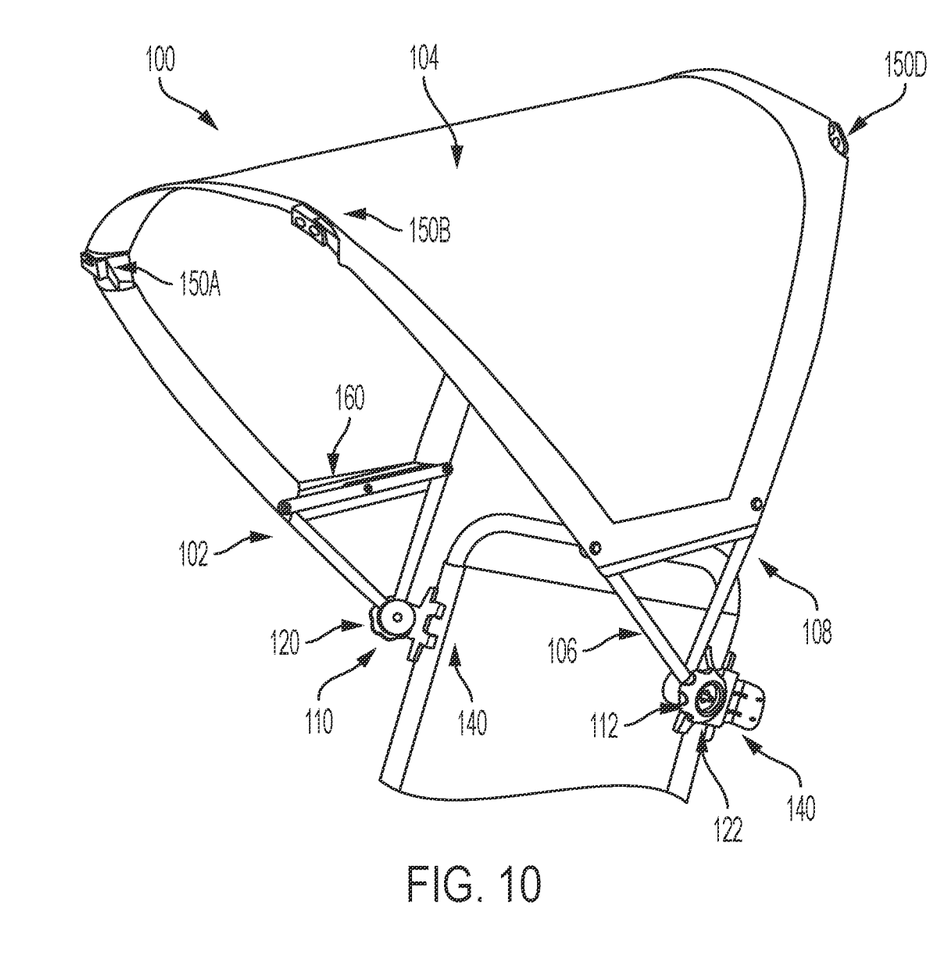
FIG. 10 illustrates the canopy of FIG. 1 attached to a chair.

As shown in FIGS. 5-6, the attachment mechanisms 140 could comprise a clip having a spring that keeps the clip biased in a closed position. In this manner, a user could apply force to the clip to open it, and when the force is removed, the clip will close and grip whatever is between the fingers of the clip. Thus, using the above example, the clip could be used to grab a pole or other component of the chair to thereby attach the canopy 100 to the chair, such as shown in FIG. 10.

Of course, other commercially suitable attachment mechanisms could alternatively be used so long as they permit the canopy 100 to be removably attached to the object. Such mechanism could include, for example, screws, bolts or other fasteners, hook and loop fasteners, latches, and so forth.

In some embodiments, the canopy 100 may also comprise a first hinged piece or connector 160 that is attached to the first and fourth struts 107A, 109A. Thus, as shown in FIG. 6, one end of the first hinged piece or connector 160 can be attached to the first strut 107A at one end and attached to the fourth strut 109A at the other end.

In addition, the canopy 100 may comprise a second hinged piece or connector 162 that is attached to the third and sixth struts 107C, 109C.

As shown, each of the hinged pieces or connectors 160, 162 preferably comprises at least two pieces that connect at one or more pivot points about which two of the pieces can rotate. When the two pieces are parallel to each other, such as shown in FIG. 6, this helps to maintain a distance between the first support piece 106 and the second support piece 108. However, when it is desired to collapse the canopy 100, the two pieces can be rotated about the pivot point, which then permits the first and second support pieces 106, 108 to move toward one another, such as shown in FIG. 7.

In some embodiments, one or both of the hinged pieces or connectors 160, 162 may comprise a latch that may be engaged when the two pieces of the connector are parallel to one another. In such embodiments, to permit movement of the pieces from the orientation shown in FIG. 6 to the orientation shown in FIG. 7, the latch would first need to be disengaged to allow the rotation. This advantageously can help prevent inadvertent collapsing of the canopy 100.

To collapse the canopy 100 from the expanded configuration shown in FIGS. 1-3, the canopy can be collapsed about two different axes. For example, as shown in FIG. 3, the first support piece 106 may pivot about axis 190 in direction A and the second support piece 108 may pivot about axis 190 in direction B, such that the first and second support pieces 106, 108 move toward one another, resulting in the configuration shown in FIG. 7.

Figure 7:
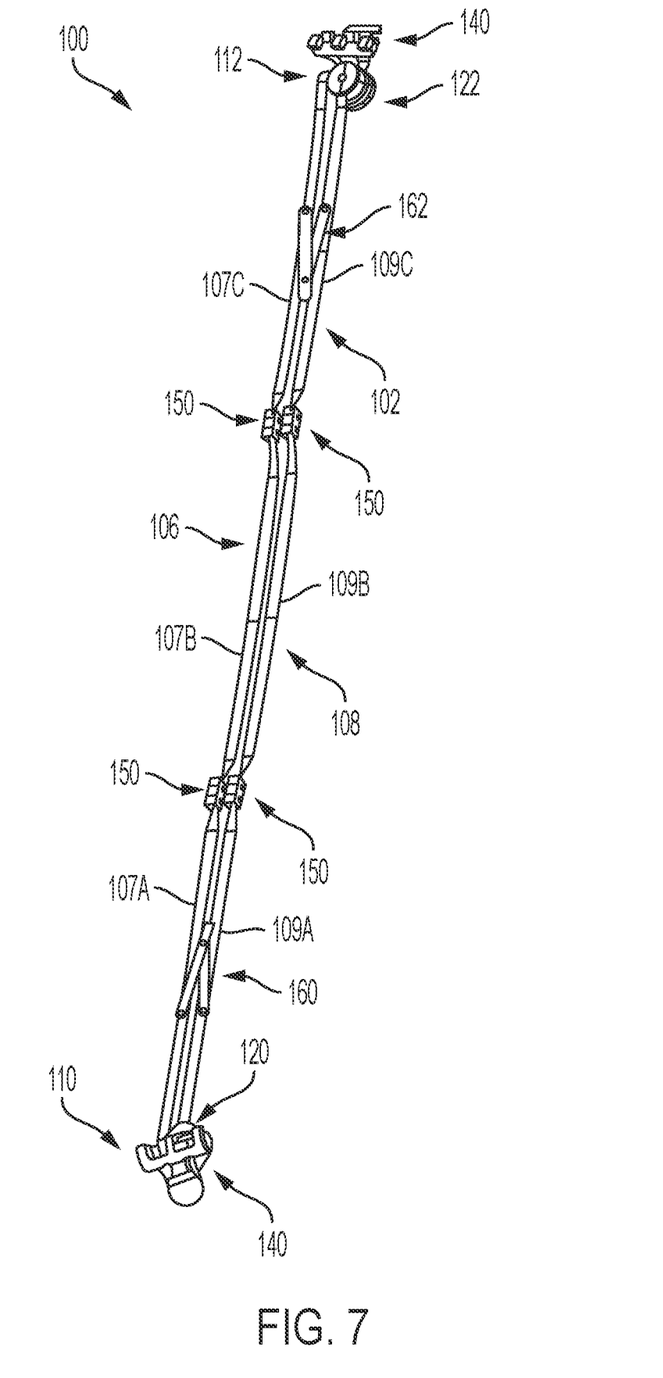
FIG. 7 illustrates the collapsible canopy of FIG. 1 in a partially collapsed position.
Figure 8:
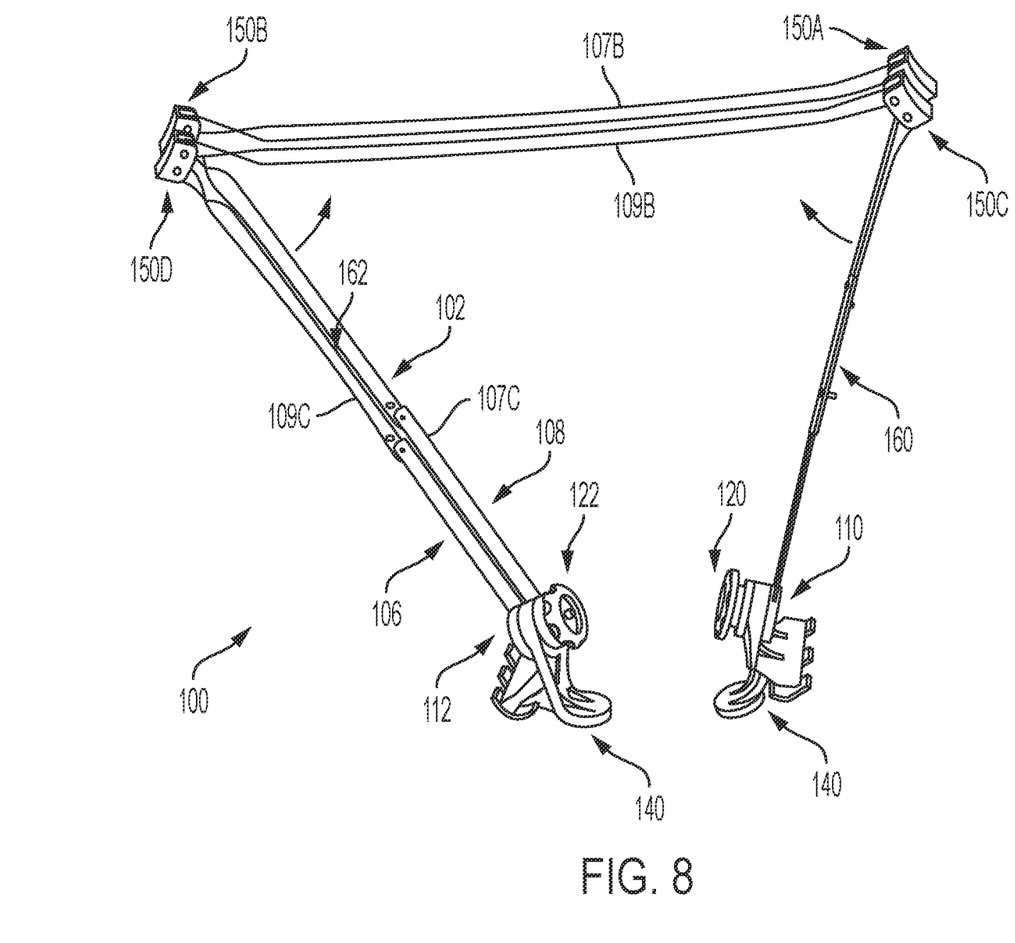
FIG. 8 illustrates the collapsible canopy of FIG. 7 where the struts of the support pieces are rotating to move the support pieces to the collapsed position shown in FIG. 9.
Figure 9:
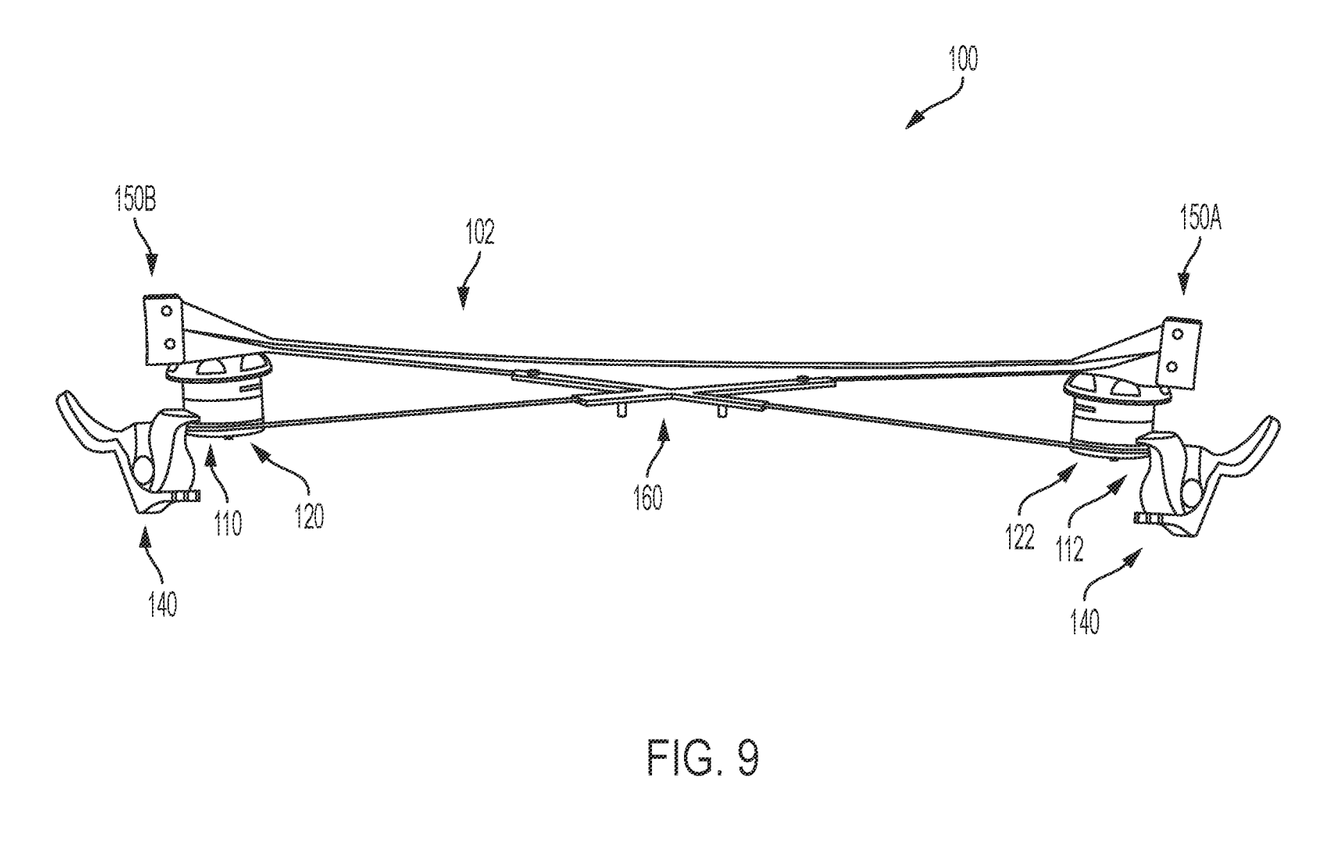
FIG. 9 illustrates the collapsible canopy in a collapsed configuration.

The struts 107A-107C of the first support piece 106 and the struts 109A-109C of the second support piece 108 can be pivoted or rotated about the respective hinges 150A-150D such that the first and second support pieces 106, 108 move from the expanded configuration shown in FIG. 3, to a parallel orientation shown in FIG. 7, to an orientation shown in FIG. 8 where the first, third, fourth and sixth struts 107A, 107C, 109A, 109C have rotated more than 180 degrees, and finally to the collapsed configuration shown in FIG. 9.

Thus, as shown in FIG. 3 for example, the first strut 107A can rotate about an axis of the first hinge 150A in a first direction C. In this manner, the first strut 107A moves outwardly or away from the third strut 107C initially when moving to the collapsed configuration. Only after being parallel to one another (as shown in FIG. 7), the first strut 107A will then move toward the third strut 107C as shown in FIG. 8. Similarly, the third strut 107C can rotate about an axis of the second hinge 150B in a first direction D. In this manner, the third strut 107C moves outwardly or away from the first strut 107A initially when moving to the collapsed configuration. Only after being parallel to one another (as shown in FIG. 7), the third strut 107C will then move toward the first strut 107A as shown in FIG. 8.

It is also contemplated that the first end 110 of the canopy 100 may comprise a first adjustment mechanism 120 which permits and/or restricts movement of the first support piece 106 relative to the second support piece 108 and/or permits movement of the attachment mechanism 140. The second end 112 may also comprise a second adjustment mechanism 122 which permits and/or restricts movement of the first support piece 106 relative to the second support piece 108 and/or permits movement of the attachment mechanism 140.

As shown, the first and second adjustment mechanisms 120, 122 can comprise a rotatable piece 130 that compresses an end of the first support piece 106 against an end of the second support piece 108 and a backstop 132 to restrict movement of the support pieces 106, 108 and/or movement of the attachment mechanism 140 when the rotatable portion is rotated in a first direction. When the rotatable piece is rotated in a second direction opposite of the first direction, the compression can be reduced or released, thereby allowing movement of the support pieces 106, 108 relative to one another and/or movement of the attachment mechanism 140. However, any commercially suitable adjustment mechanism could be used, which restricts and/or permits movement of the support pieces 106, 108 and/or movement of the attachment mechanism 140.

Figure 11:
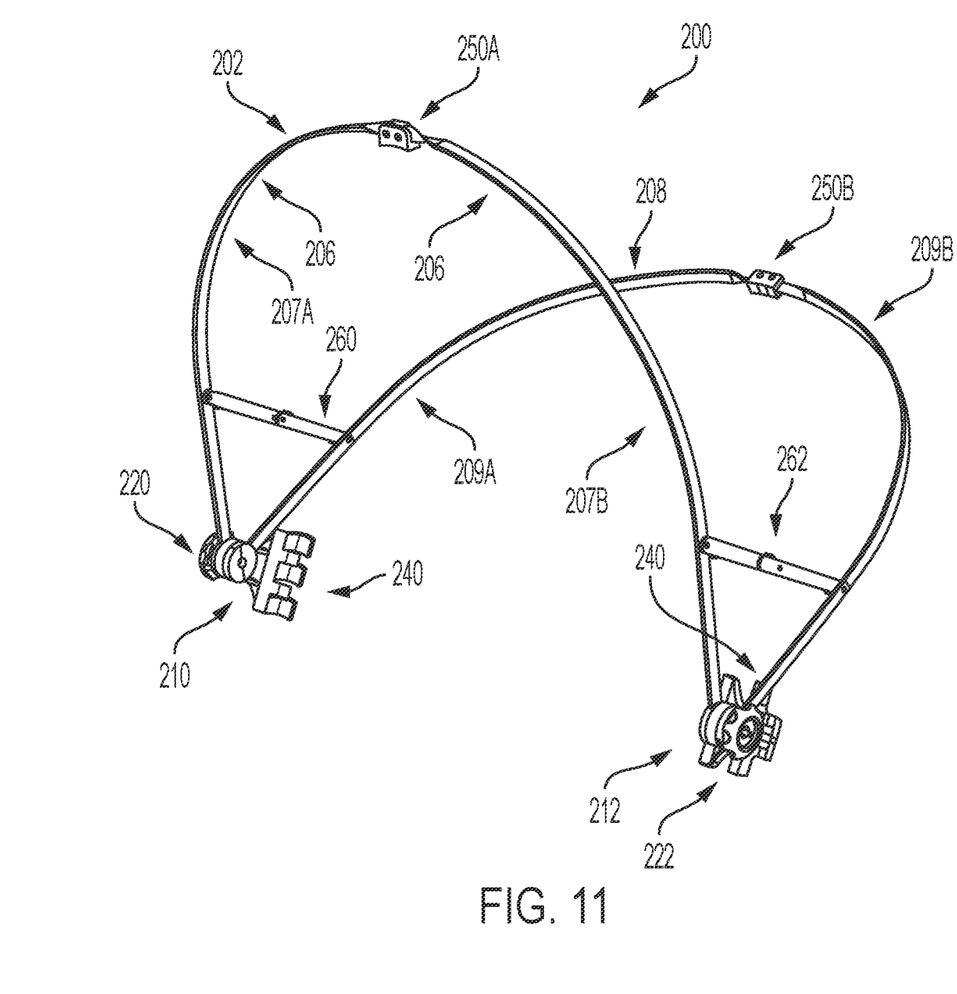
FIG. 11 illustrates a left, front perspective view of another embodiment of a collapsible canopy.

FIG. 11 illustrates another embodiment of a collapsible canopy 200. The canopy 200 preferably has a frame 202 and a sheet of material, like the embodiment in FIG. 1, connected to at least a portion of the frame 202 to create the canopy when the frame 202 is in an expanded configuration shown in FIG. 11.

The frame 202 preferably comprises a first support piece 206 and a second support piece 208 that are coupled together at first and second opposing ends 210, 212. In this manner, the first support piece 206 and second support piece 208 each extends from the first end 210 to the second end 212.

The first support piece 206 preferably comprises at least two struts, and as shown in FIG. 11, may comprise a first strut 207A and a second strut 207B, which are hingedly coupled in series. The first strut 207A is hingedly coupled to the second strut 207B by a first hinge 250A, such that the first and second struts 207A, 207B are movable about the first hinge 250A. In the expanded configuration shown in FIG. 11, it is contemplated that the first and second struts 107A-107B form a "C" shape. Advantageously, hinge 150A allows the first support piece 206 to fold and thereby reduce the space required to store the canopy 200 when the canopy 200 is in a collapsed configuration (e.g., strut 107A is stacked on strut 107B).

In the embodiment shown in FIG. 11, for example, the hinge 150A permits movement of the first and second struts 207A-207B from (i) a collapsed configuration where the first strut 207A is stacked on the second strut 207B to (ii) an expanded configuration where the first strut 207A is not stacked on the second strut 207B (shown in FIG. 11).

The second support piece 208 preferably also comprises at least two struts, and as shown in FIG. 11, may comprise a third strut 209A and a fourth strut 209B, which are hingedly coupled in series. The third strut 209A is hingedly coupled to the fourth strut 209B by a second hinge 250B, such that the third and fourth struts 209A, 209B are movable about the hinge 250B. Advantageously, the hinge 250B allows the second support piece 208 to fold and thereby reduce the space required to store the canopy 200 when the canopy 200 is in a collapsed configuration (e.g., strut 209A is stacked on strut 209B).

In the embodiment shown in FIG. 11, for example, the hinge 150B permits movement of the third and fourth struts 209A, 209B from (i) a collapsed configuration where the third strut 209A is stacked on the fourth strut 209B to (ii) an expanded configuration where the third strut 209A is not stacked on the fourth strut 209B (shown in FIG. 11).

Preferably, each of the struts are flexible and may be composed of spring steel, fiberglass, plastic, or other materials or combinations thereof, such that the struts can elastically bend or flex and return to a normal position. This flexibility advantageously permits the support pieces 206, 208 to adapt the canopy 200 to objects having different sizes and dimensions that may not be possible with a rigid material Each of the first and second ends 210, 212 preferably also comprises an attachment mechanism 240, which is configured to attach each of the first and second ends 210, 212 of the frame 202 to a chair or other object. Thus, for example, using the attachment mechanisms 240 disposed at each of the first and second ends 210, 212, the canopy 200 can be coupled to a chair or other object, such as to provide shade to whomever is sitting in the chair. When not in use, the canopy 200 can be removed from the object and collapsed for ease of storage.

In such embodiments, one of the attachment mechanisms 240 can be coupled to the first strut 207A and the third strut 209A and the other attachment mechanism 240 can be coupled to the second strut 207B and the fourth strut 209B.

As shown in FIG. 11, the attachment mechanisms 240 could comprise a clip having a spring that keeps the clip biased in a closed position. In this manner, a user could apply force to the clip to open it, and when the force is removed, the clip will close and grip whatever is between the fingers of the clip. Thus, using the above example, the clip could be used to grab a pole or other component of the chair to thereby attach the canopy 200 to a chair or other object.

Of course, other commercially suitable attachment mechanisms could alternatively be used so long as they permit the canopy 200 to be removably attached to the object. Such mechanism could include, for example, screws, bolts or other fasteners, hook and loop fasteners, latches, and so forth.

In some embodiments, the canopy 200 may also comprise a first hinged piece or connector 260 that is attached to the first and third struts 207A, 209A. One end of the first hinged piece or connector 260 can be attached to the first strut 207A at one end and attached to the third strut 209A at the other end.

In addition, the canopy 200 may comprise a second hinged piece or connector 262 that is attached to the second and fourth struts 207B, 209B.

As shown, each of the hinged pieces or connectors 260, 262 preferably comprises at least two pieces that connect at one or more pivot points about which two of the pieces can rotate. When the two pieces are parallel to each other, this helps to maintain a distance between the first support piece 206 and the second support piece 208. However, when it is desired to collapse the canopy 200, the two pieces can be rotated about the pivot point, which then permits the first and second support pieces 206, 208 to move toward one another.

In some embodiments, one or both of the hinged pieces or connectors 260, 262 may comprise a latch that may be engaged when the two pieces of the connector are parallel to one another. In such embodiments, to permit movement of the pieces, the latch would first need to be disengaged to allow the rotation. This advantageously can help prevent inadvertent collapsing of the canopy 200.

To collapse the canopy 200 from the expanded configuration shown in FIG. 11, the canopy can be collapsed about two different axes, similarly to that discussed above. For example, the first support piece 206 may pivot about a first axis in first rotational direction and the second support piece 208 may pivot about the first axis in a second rotational direction that is opposite of the first rotational direction, such that the first and second support pieces 206, 208 move toward one another.

The struts 207A-207B of the first support piece 206 and the struts 209A-209B of the second support piece 208 can be pivoted or rotated about the respective hinges 250A, 250B such that the first and second support pieces 206, 208 move from the expanded configuration shown in FIG. 11, to a collapsed configuration. This can be accomplished as described above with respect to FIGS. 1-10.

It is also contemplated that the first end 210 of the canopy 200 may comprise a first adjustment mechanism 220 which permits and/or restricts movement of the first support piece 206 relative to the second support piece 208 and/or permits movement of the attachment mechanism 240. The second end 212 may also comprise a second adjustment mechanism 222 which permits and/or restricts movement of the first support piece 206 relative to the second support piece 208 and/or permits movement of the attachment mechanism 240.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Any numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Moreover, and unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A collapsible canopy, comprising:
a frame comprising:
a first support piece having at least two struts that are coupled to one another by a first hinge, such that the at least two struts are movable about the first hinge from (i) a collapsed configuration where one of the struts is stacked on top of the other strut to (ii) an expanded configuration where the at least two struts extend in opposite directions from the first hinge;
a second support piece having at least two struts that are coupled to one another by a second hinge, such that the at least two struts are movable about the second hinge from (i) a collapsed configuration where one of the struts is stacked on top of the other strut to (ii) an expanded configuration where the at least two struts extend in opposite directions from the second hinge;
wherein the first and second support pieces are coupled to one another at a first end at a first pivot point;
wherein the first and second support pieces are coupled to one another at a second end at a second pivot point;
a sheet of material coupled to the frame and configured to extend from the first support piece to the second support piece;
a first attachment mechanism disposed at the first end and configured to attach the frame to an object; and
a second attachment mechanism disposed at the second end and configured to attach the frame to the object.

2. The collapsible canopy of claim 1, wherein the first attachment mechanism and the second attachment mechanism each comprises a clip configured to attach the frame to opposing sides of the object.

3. The collapsible canopy of claim 2, wherein the object comprises a chair.

4. The collapsible canopy of claim 1, wherein the at least two struts of the first support piece comprises a first strut, a second strut and a third strut, and wherein the first strut is coupled to the second strut by the first hinge, such that the first and second struts are movable about the first hinge, and wherein the second strut is coupled to the third strut by a third hinge, such that the second and third struts are movable about the third hinge, wherein the first and third hinges permit movement of the first, second and third struts from (i) a collapsed configuration where each of the first and third struts is stacked above the second strut to (ii) an expanded configuration where the first and third struts are not stacked above the second strut.

5. The collapsible canopy of claim 1, wherein the at least two struts of the second support piece comprises a first strut, a second strut and a third strut, and wherein the first strut is coupled to the second strut by the second hinge, such that the first and second struts are movable about the second hinge, and wherein the second strut is coupled to the third strut by a third hinge, such that the second and third struts are movable about the third hinge, wherein the second and third hinges permit movement of the first, second and third struts from (i) a collapsed configuration where each of the first and third struts is stacked above the second strut to (ii) an expanded configuration where the first and third struts are not stacked above the second strut.

6. The collapsible canopy of claim 1, wherein each of the at least two struts of the first and second support pieces is composed of a flexible material.

7. The collapsible canopy of claim 1, wherein each of the at least two struts of the first and second support pieces is composed of spring steel.

8. The collapsible canopy of claim 1, wherein each of the first and second support pieces form a "U" or "C" shape when in the expanded configuration.

9. The collapsible canopy of claim 8, wherein one of the at least two struts of the first support piece can pivot about the first hinge more than 180 degrees in a first direction when moving from the collapsed configuration to the expanded configuration, and wherein one of the at least two struts of the second support piece can pivot about the second hinge in the first direction more than 180 degrees when moving from the collapsed configuration to the expanded configuration.

10. A frame for a collapsible canopy, comprising:
first, second and third struts coupled together in series to form a first support piece, wherein the first strut is coupled to the second strut by a first hinge, such that the first and second struts are movable about the first hinge, and wherein the second strut is coupled to the third strut by a second hinge, such that the second and third struts are movable about the second hinge, wherein the first and second hinges permit movement of the first, second and third struts from (i) a collapsed configuration where each of the first and third struts is stacked above the second strut to (ii) an expanded configuration where the first and third struts are not stacked above the second strut;
fourth, fifth and sixth struts coupled together in series to form a second support piece, wherein the fourth strut is coupled to the fifth strut by a third hinge, such that the fourth and fifth struts are movable about the third hinge, and wherein the fifth strut is coupled to the sixth strut by a fourth hinge, such that the fifth and sixth struts are movable about the fourth hinge, wherein the third and fourth hinges permit movement of the fourth, fifth and sixth struts from (i) a collapsed configuration where each of the fourth and sixth struts is stacked above the fifth strut to (ii) an expanded configuration where the fourth and sixth struts are not stacked above the second fifth;
a first attachment mechanism disposed at a first end of the first and second support pieces and is coupled to the first and fourth struts;
a second attachment mechanism disposed at a second end of the first and second support pieces and is coupled to the third and sixth struts;
wherein the first and fourth struts are connected via a first hinged piece; and
wherein the third and sixth struts are connected via a second hinged piece.

11. The collapsible canopy of claim 10, wherein the first attachment mechanism and the second attachment mechanism each comprises a clip configured to attach the frame to opposing sides of the object.

12. The collapsible canopy of claim 11, wherein the object comprises a chair.

13. The collapsible canopy of claim 10, wherein each of the struts of the first and second support pieces is composed of a flexible material.

14. The collapsible canopy of claim 10, wherein each of the struts of the first and second support pieces is composed of spring steel.

15. The collapsible canopy of claim 10, wherein the first, second and third struts form a "U" or "C" shape when in the expanded configuration.

16. The collapsible canopy of claim 15, wherein the first strut can pivot about the first hinge more than 180 degrees in a first direction when moving from the collapsed configuration to the expanded configuration, and wherein the third strut can pivot about the second hinge in a second direction more than 180 degrees when moving from the collapsed configuration to the expanded configuration, and wherein the first direction is opposite of the second direction.

\* \* \* \* \*